United States Patent [19]

Martini

[11] Patent Number: 4,465,308
[45] Date of Patent: Aug. 14, 1984

[54] CONNECTION FLANGE FOR TUBULAR MEMBERS

[75] Inventor: Alfred R. G. Martini, Grass Lake, Mich.

[73] Assignee: Tenneco Inc., Bannockburn, Ill.

[21] Appl. No.: 318,348

[22] Filed: Nov. 5, 1981

[51] Int. Cl.³ ............................................. F16L 25/00
[52] U.S. Cl. .................................... 285/177; 285/261; 285/424; 285/137 R
[58] Field of Search ....... 285/263, 424, 363, DIG. 18, 285/261, 166, 167, 160, 177, 137 R

[56] References Cited

U.S. PATENT DOCUMENTS

| | | | |
|---|---|---|---|
| 2,106,628 | 1/1938 | Compo | 285/183 |
| 2,318,006 | 5/1943 | Mercier | 285/263 |
| 2,319,939 | 5/1943 | Markey | 285/263 |
| 3,033,595 | 5/1962 | Bard | 285/263 X |
| 3,165,339 | 1/1965 | Fallou | 285/263 |
| 3,275,346 | 9/1966 | Gregg | 285/49 |
| 4,071,269 | 1/1978 | Holling et al. | 285/263 X |
| 4,132,285 | 1/1979 | Milde et al. | 181/258 |

FOREIGN PATENT DOCUMENTS

| | | | |
|---|---|---|---|
| 821890 | 11/1951 | Fed. Rep. of Germany | 285/263 |
| 310913 | 5/1929 | United Kingdom | 285/263 |

Primary Examiner—Dave W. Arola
Attorney, Agent, or Firm—Thomas E. Torphy

[57] ABSTRACT

A connection flange for tubular members is formed as a separate member having a sealing surface formed on the connection flange for sealingly engaging a complementary mating surface, a formed annulus for receiving an end of a tubular member and a radially extending web having openings to enable threaded fasteners to force the flange sealing surface into sealing engagement with the complementary mating surface. A tubular member is sealingly affixed to the formed annulus by welding. The flange is formed of a relatively thicker material than the tubular member to which it is affixed to provide material and weight savings by enabling the tubular member to be formed of a relatively thin, light weight material.

10 Claims, 10 Drawing Figures

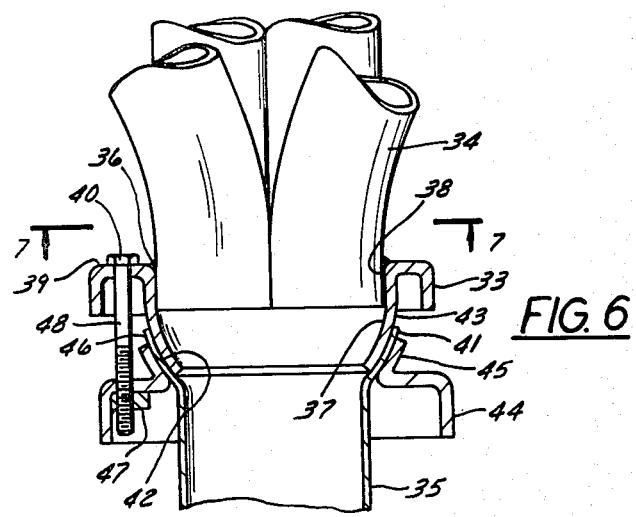

CONNECTION FLANGE FOR TUBULAR MEMBERS

BACKGROUND OF THE INVENTION

Ball and flare joints are commonly used to connect vehicle exhaust system components together in sealing engagement. In forming such joint it has been common practice to have a flared annular portion on one mating member and a mating spherical ball portion formed integral with a tube to be connected to the other member. The sperical ball portion is formed on the tube wall by conventional forming methods such as spinning or swaging the metal adjacent the end of the tube. Normally, a flange is then affixed to the tube a selected distance back from the formed end and threaded fasteners are used to force the formed end into sealing engagement with the mating member. In some applications a composition or sintered gasket member, which may be formed as a ball receiving annulus or as an annular portion of a sphere is interposed between the sealing surface of the flange and the mating component to aid in effecting sealing.

Due to the force required to be imposed on the mating surface to achieve a gas tight seal it has often been necessary to form the tube on which the mating portion is formed or on which the gasket is mounted of a thicker gauge of metal solely to prevent collapse of the mating or gasket supporting portion. Forming the tube of a thicker metal increases the material cost of the tube and increases its weight. These factors detract from the economic efficiency of the component and the energy efficiency of the vehicle on which the component is mounted.

SUMMARY OF THE INVENTION

A flange having a sealing section is welded to the end of a pipe to enable acheivement of a gas tight joint between the flange-pipe assembly and a mating component having a sealing section compatible with the sealing section on the flange.

By having the sealing section attached to or formed integral with the flange, the flange can be formed of a heavier gauge metal and the pipe itself can be formed of a lighter gauge material to effect a cost savings for material and, due to weight reduction, enhance the energy efficiency of the vehicle on which the component is installed.

BRIEF DESCRIPTION OF THE DRAWINGS

FIG. 6 shows a fabricated multiple tube assembly connected to a modified form of a flange of this invention;

FIG. 7 shows a sectional view of the fabricated tube shown in FIG. 6;

FIG. 8 shows an alternate form of a flange of this invention;

FIG. 9 shows another alternate form of the flange of this invention; and,

FIG. 10 shows another alternate form of a flange of this invention.

DETAILED DESCRIPTION OF THE INVENTION

Figure 1:
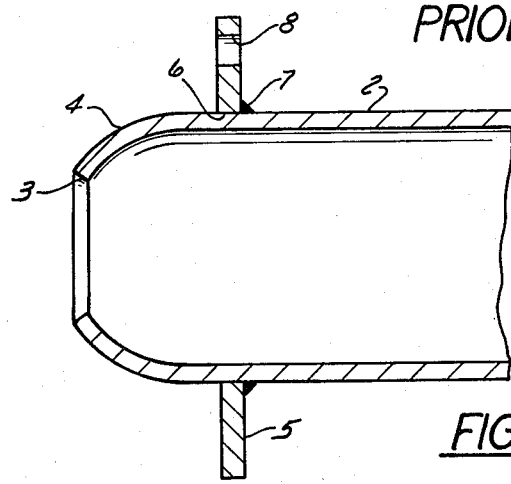
FIG. 1 shows a typical prior art connection tube.

FIG. 1 shows a typical prior art connection end for a exhaust conduit of a vehicle having an internal combustion engine. A tubular member or pipe 2 has an end 3 having a formed end 4, typically, as shown, formed as a portion of a sphere. Axially displaced at some length down the pipe is a flange member 5 having a central opening 6 for receiving pipe 2. Flange member 5 is attached to pipe 2 by appropriate means, such as, as shown, weld 7 and a plurality of bolt receiving openings, such as opening 8 are provided in flange 5 to enable spherical portion 4 to be forced into sealing engagement with a mating portion, typically a flared spherical section, of another component, not shown, such as the exhaust manifold outlet or an exhaust pipe of an engine.

Due to the forces required to effect sealing between the mating components the thickness of the wall of the pipe is typically required to be in the range of about 0.080 of an inch to about 0.100 of an inch to prevent collapse of the formed end of the tube as it is drawn into sealing engagement by threaded fasteners.

Figure 2:
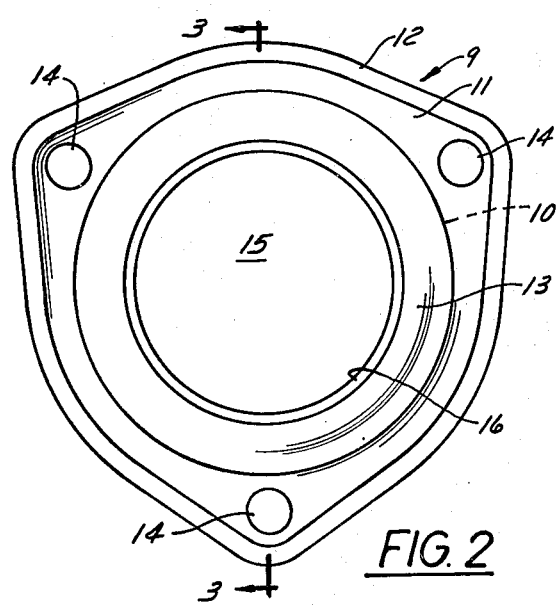
FIG. 2 shows a full frontal view of a flange of this invention.
Figure 3:
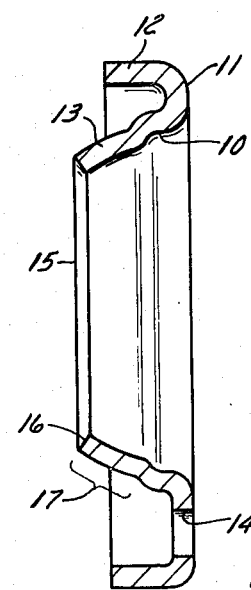
FIG. 3 shows a full sectioned side view of the flange shown in FIG. 2.

FIG. 2 shows a front view of a flange 9 of this invention and FIG. 3 shows a side sectioned view of FIG. 2, as indicated by the section line. Flange 9 is, as shown, formed from one piece of metal and has an annular tube receiving portion or socket 10, a radially outwardly extending web portion 11, an axially extending reinforcing portion 12 and an axially extending spherical section mating portion 13. Web portion 11 contains fastener receiving means comprising a plurality of openings 14 for receiving threaded fasteners. A fluid flow opening 15 is defined by terminal end 16 of mating porion 13. Spherical section mating portion 13 has a radially outward facing axially extending outer spherical surface 17 for sealingly engaging a mating component in an angularly adjustable manner.

Figure 4:
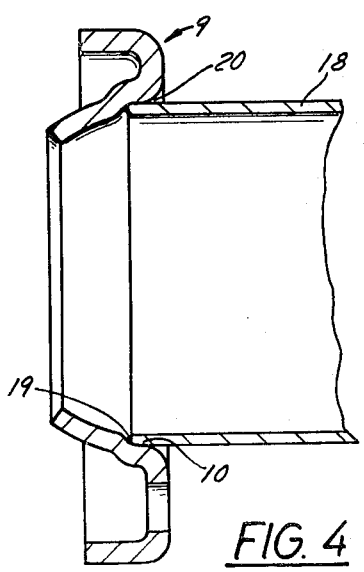
FIG. 4 shows the flange of FIG. 2 connected to a tubular member.

FIG. 4 shows the flange 9 as shown in FIG. 3 to which a tubular member 18 has been inserted into portion 10 and sealingly and rigidly affixed to the flange 9 by appropriate affixing means, such as, as shown, welding at 19. Alternatively, and for some applications, preferably, the tube may be welded to the flange adjacent the outside end surface 20 of the tube.

As shown in FIG. 4 the flange 9 is formed of a relatively thick material relative to the thickness of the material used to form the tube, such as sheet metal having a thickness of about 0.120 of an inch to about 0.170 of an inch, and the tube or pipe 18 is formed of a considerably thinner and consequently lighter material such as sheet metal having a thickness of about 0.030 of an inch to about 0.060 of an inch for typical applications in which each the flange and tube are formed of 409 stainless steel.

Figure 5:
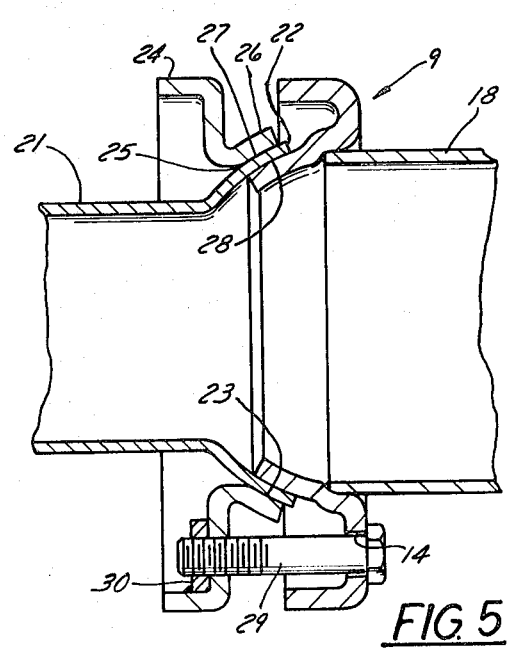
FIG. 5 shows the assembly of FIG. 4 connected in sealing engagement with mating components.

FIG. 5 shows the flange 9 and pipe 18 assembly of FIG. 4 assembled into a typical sealed relationship with a fluid conductor 21, which would typically be the exhaust pipe of an exhaust system of an internal combustion engine.

The sealed assembly is comprised of fluid conductor 21, having a terminal end 22. Formed integral with conductor 21 is a radially outwardly extending annular spherical flared portion 23 adjacent end 22. A flange member 24 is mounted on conductor 21. Flange 24 has a conductor receiving central opening 25, an axially extending annular spherical flared seal effecting portion 26 coaxial with and appropriately sized and configured to have a substantially radially inwardly facing surface 27 engage a substantially radially outward facing surface 23 on the flared portion 28 of conductor 21.

As shown, appropriate removable fastening means, such as bolt 29 passes through openings 14 and threadedly engages a nut 30 in flange 24. As the bolts 29 re tightened the flared portion 28 of tube 21 is compressed into sealing engagement with a continuous annular portion of surface 17 to effect a seal between flange 9 and pipe 21. The joint, prior to tightening of the bolts 29, enables angular adjustment of pipe 18 with respect to flange 9 to enable pipe 18 to be placed in a desired position with respect to other components (not shown) such as portions of a vehicle chassis. The bolts are then tightened to effect a gas tight and acoustic seal.

FIG. 6 shows a tubular joint having an alternate form of flange 33 of this invention in which the flange is used to connect a fabricated tubular member, such as a fabricated engine exhaust manifold outlet 34 to an appropriately sized and configured tubular member, such as exhaust pipe 35. As shown in FIG. 7, manifold 34 is formed of a plurality of tubular members in which each tube forms a portion of the manifold outlet and the peripheral surface of the outlet is circular.

Flange 33 of this invention is then placed on the end of the outlet and sealingly affixed to the manifold outlet by appropriate means, such as weld 36. In this application the flange 33 also serves as a collector for the multiple tube manifold.

Flange 33 is preferably formed from one piece of metal and has an annulus 37 formed as a section of a sphere, a pipe receiving annulus 38 and a radially extending web 39 having a plurality of fastener receiving openings 40. Exhaust pipe 35 has a flared annulus 41 formed as an annular section of a sphere. Flare 41 is appropriately sized for engagement of its radially inward facing surface 42 with the radially outward facing surface 43 of annulus 37. A mating flange 44 on exhaust pipe 35 has an annular flare 45 for contacting a radially outward facing surface 46 of flare 41 and fastener receiving means, such as a nut 47 for receiving a threaded fastener, such as a bolt 48, which extends between flange 33 and mating flange 44. As the plurality of bolts 48 are tightened flare 41 is compressed between spherical surface 43 and flange 45 to effect a gas tight and acoustic seal between surfaces 42 and 43.

FIG. 8 shows another form of the flange of this invention in which a flange 50 has an annular sealing portion 51 formed as a section of a sphere, a radially outwardly extending web portion 52 and a tubular member receiving annulus 53 formed at the periphery of the web portion 52. A tubular component 54, such as the casing or shell of a gas treatment means 55, such as a catalytic converter or a muffler, is sealing by affixed to the annulus 53 by appropriate means, such as weld 56. A plurality of fastener receiving openings, such as opening 57 are provided in the web portion 52 intermediate sealing annulus 51 and pipe receiving annulus 53. As shown in FIG. 8, an appropriately sized pipe and mating flange are sealingly connected to sealing annulus 51 in substantially the same way as described for the arrangements shown in FIGS. 5 and 6.

FIG. 9 shows another alternate embodiment of a flange of this invention in which a flange 58 is formed having an axially extending annulus 59 having a radially extending shoulder 60, a radially extending web portion 61 and a tube receiving annulus 62. A tube 63 is sealingly secured to tube receiving annulus 62 by appropriate means such as 64. A plurality of threaded fastener receiving openings, such as opening 65, are provided in web portion 61.

In this embodiment a formed or molded gasket 66 is placed on a radially outward facing surface 67 of annulus 59 and engages and abuts against shoulder 60 of flange 58. Gasket 66 may be formed of a variety of materials such as sintered metal or a composite of materials such as wound metal with fibrous filters. A substantially radially outwardly facing sealing surface 68 of gasket 66 is formed having an annular section of a sphere for engaging a complementary surface on the flared annulus of a mating tubular member, as described for FIGS. 5, 6, and 8. Using the gasket 66 the properties of the sealing surface 68 can be controlled for abrasiveness and sealability while still retaining the strength of the flange needed to effect sealing.

FIG. 10 shows an alternate embodiment of the flange of this invention in which a flange 69 is formed having a frustoconical sealing surface 70. Surface 70 would sealingly engage a complementary frustoconical sealing surface of a mating tubular member (not shown) in the same manner as described for the embodiments shown in FIGS. 5, 6, and 8. A disadvantage of the frustoconical sealing surface shown in FIG. 10 is that it does not enable angular adjustment of one assembly relative to the other. However, where angular adjustments are not required this form of flange offers the advantage of weight and material savings.

In flanges having annular sealing portions having an annular spherical section for the sealing surface angular adjustments between the mating members can be made prior to tightening the bolts to their final position to seal the members together. This ability to make angular adjustments and then accomplish sealing is particularly advantageous in automotive exhaust system mountings where the exhaust system components must be routed through relatively confined spaces between various other components of the vehicle chassis.

What is claimed is:

1. A connection flange formed of sheet metal of substantially uniform thickness for connecting a first fluid flow conduit having a flared end with an inner sealing surface to a second fluid flow conduit and for maintaining a substantially gas tight connection comprising:
   a. an annular sealing portion extending in a first axial direction to sealingly engage the inner sealing surface of a flared end of said first conduit,
   b. an annular web portion concentric with said sealing portion and extending radially at the periphery of said flange,
   c. an annular socket for receiving an end of said second conduit, open toward the axial direction opposite to said first axial direction, and formed integrally in said flange concentric with and between said sealing portion and said web portion, and
   d. at least two apertures formed in said web for receiving axially extending fastener means for drawing said sealing portion into engagement with said flared end.

2. The invention as defined in claim 1 in which said sealing portion is formed as an annular section of a sphere to permit limited angular movement between said conduits.

3. The invention as defined in claim 1 in which said sealing portion is formed in a frustoconical shape.

4. The invention as defined in claim 21 in which the radially outward edge of said web portion is turned in an axial direction to form a reinforcing portion.

5. The invention as defined in claim 1 in which said flange is formed of sheet metal substantially thicker than the thickness of walls of said second conduit.

6. The invention as defined in claim 1 in which said flange is formed of sheet metal of at least 0.150 of an inch and said second conduit has a thickness of less than 0.100 of an inch.

7. The invention as defined in claim 1 together with a second flange having flare engaging means for engaging said flared end of said first conduit, said fastener means connecting said connection flange with said second flange.

8. The invention as defined in claim 1 in which said second conduit comprised the outlet end of an engine exhaust gas manifold formed of a plurality of tubular members.

9. The invention as defined in claim 6 in which said flange serves as both a one piece exhaust gas collector and a connection flange for said outlet of said exhaust gas manifold.

10. A connection assembly for connecting a first fluid flow conduit having a flared end with an inner and outer surface to a second fluid flow conduit and for maintaining a substantially gas tight connection comprising:
 a. a first flange comprising:
  1. an annular sealing portion formed as a section of a sphere and extending in a first axial direction to sealingly engage the inner surface of a mounting flared end of said first conduit,
  2. an annular web portion concentric with said sealing portion and extending radially from said sealing portion having apertures therein, and
  3. a conduit receiving cylindrical portion formed at the periphery of said web portion and extending in a axial direction to sealingly engage said second conduit,
 b. a second flange having apertures therein and a flare engaging portion for engaging said flared end of said first conduit on the outer surface of said flared end, and
 c. threaded fastening means passing through said apertures in said second flange and threaded into corresponding apertures in said web portion to draw said first and second flanges toward each other with said flared end therebetween.

* * * * *